United States Patent
Shiota et al.

(10) Patent No.: US 12,049,379 B2
(45) Date of Patent: Jul. 30, 2024

(54) MEDIUM FEEDING APPARATUS, IMAGE READING APPARATUS, AND MEDIUM FEEDING METHOD

(71) Applicant: Seiko Epson Corporation, Tokyo (JP)

(72) Inventors: Takayuki Shiota, Kitakyushu (JP); Seiji Eguchi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 408 days.

(21) Appl. No.: 17/555,650

(22) Filed: Dec. 20, 2021

(65) Prior Publication Data
US 2022/0194727 A1    Jun. 23, 2022

(30) Foreign Application Priority Data

Dec. 22, 2020   (JP) ................................. 2020-212197

(51) Int. Cl.
| | |
|---|---|
| B65H 7/06 | (2006.01) |
| B65H 5/06 | (2006.01) |
| B65H 7/12 | (2006.01) |
| H04N 1/00 | (2006.01) |

(52) U.S. Cl.
CPC .............. *B65H 7/125* (2013.01); *B65H 7/06* (2013.01); *H04N 1/00013* (2013.01); *H04N 1/00037* (2013.01); *H04N 1/0071* (2013.01); *H04N 1/00745* (2013.01); *B65H 5/06* (2013.01); *B65H 2511/12* (2013.01); *B65H 2513/41* (2013.01); *B65H 2513/51* (2013.01); *B65H 2701/18292* (2013.01)

(58) Field of Classification Search
CPC .............. B65H 7/06; B65H 7/14; B65H 7/12; B65H 7/125; B65H 2513/51; B65H 2701/18292
See application file for complete search history.

(56) References Cited

U.S. PATENT DOCUMENTS

| | | | | |
|---|---|---|---|---|
| 8,727,347 | B2 * | 5/2014 | Ishikawa | ................ B65H 7/125 |
| | | | | 271/262 |
| 11,292,683 | B2 * | 4/2022 | Shiota | ................ H04N 1/00777 |
| 2008/0265497 | A1 * | 10/2008 | Kimura | ................ B65H 3/063 |
| | | | | 271/228 |
| 2019/0100396 | A1 * | 4/2019 | Shiota | ................ H04N 1/00734 |
| 2022/0204294 | A1 * | 6/2022 | Eguchi | ..................... B65H 7/06 |

FOREIGN PATENT DOCUMENTS

| | | |
|---|---|---|
| JP | 2019-064790 | 4/2019 |
| JP | 2020-033144 | 3/2020 |
| JP | 2021-083051 | 5/2021 |

* cited by examiner

*Primary Examiner* — Patrick Cicchino
(74) *Attorney, Agent, or Firm* — WORKMAN NYDEGGER (57) ABSTRACT

A control unit of a medium feeding apparatus is configured to execute a fault detection process to determine that there is a feeding fault when a movement of a subsequent medium in a feeding direction is detected based on detection information of a movement detection unit within a fault detection period that is set after a trailing edge of a preceding medium is detected based on the detection information of the movement detection unit and before feeding of the subsequent medium is started, and the fault detection period set when a size of the medium in a width direction intersecting the feeding direction is a first size is shorter than the fault detection period set when the size of the medium in the width direction is a second size larger than the first size.

8 Claims, 9 Drawing Sheets

|  | Ly < Ly1 | Ly1 ≤ Ly ≤ Ly2 | Ly2 < Ly |
|---|---|---|---|
| Lx < Lx1 | t1 | t2 | t3 |
| Lx1 ≤ Lx ≤ Lx2 | t2 | t3 | t4 |
| Lx2 < Lx | t3 | t4 | t5 |

MEDIUM FEEDING APPARATUS, IMAGE READING APPARATUS, AND MEDIUM FEEDING METHOD

The present application is based on, and claims priority from JP Application Serial Number 2020-212197, filed Dec. 22, 2020, the disclosure of which is hereby incorporated by reference herein in its entirety.

BACKGROUND

1. Technical Field

The present disclosure relates to a medium feeding apparatus that feeds a medium and an image reading apparatus including the medium feeding apparatus. The present disclosure also relates to a medium feeding method implemented by the medium feeding apparatus.

2. Related Art

In a medium feeding apparatus that feeds a medium, a plurality of media may be set and fed while the media are bound with a staple, or the like. Here, a description is given below of the phenomenon that occurs when the medium at the bottom is fed while the media are bound at a corner portion on the trailing edge side. Hereinafter, the fed medium at the bottom is referred to as "preceding medium", and the medium located on the preceding medium is referred to as "subsequent medium".

When the preceding medium is delivered, only the trailing edge of the subsequent medium moves downstream together with the preceding medium, as the leading edge of the subsequent medium is kept stopped by a separation unit. Accordingly, the subsequent medium becomes curved upward, a trailing edge region of the subsequent medium is eventually turned over, a gap is formed between the trailing edge of the preceding medium and the trailing edge of the subsequent medium, and in this state, the trailing edge of the preceding medium and the trailing edge of the subsequent medium move downstream.

In consideration of the above-described tendency, a medium feeding apparatus disclosed in JP-A-2019-064790 includes a movement detection unit that is provided at a position opposed to a surface of the preceding medium to detect a movement of the medium in a feeding direction so that, when the movement of the subsequent medium is detected after the trailing edge of the preceding medium is detected and before the feeding of the subsequent medium is started, it is determined that there is a feeding fault, and the feeding of the medium is stopped. Hereinafter, the above-described feeding fault is referred to as "trailing-edge binding fault".

For the state detection of the subsequent medium to detect the trailing-edge binding fault, the movement of the subsequent medium is monitored by the movement detection unit, and when it is determined that the subsequent medium has moved, it is determined that there is the trailing-edge binding fault. Therefore, when the subsequent medium has moved due to a disturbance such as vibration, it may be improperly determined that there is the trailing-edge binding fault, although there is no trailing-edge binding fault.

SUMMARY

According to an aspect of the present disclosure, a medium feeding apparatus includes a medium mounted section where a medium is mounted, a feed roller feeding the medium mounted on the medium mounted section in a feeding direction, a movement detection unit located upstream of the feed roller in the feeding direction to output information about a movement of the medium in the feeding direction, and a control unit controlling, based on information obtained from the movement detection unit, feeding of the medium, in which when a movement of a subsequent medium in the feeding direction is detected based on detection information of the movement detection unit within a fault detection period that is set after a trailing edge of a preceding medium is detected based on the detection information of the movement detection unit and before feeding of the subsequent medium is started, the control unit is configured to execute a fault detection process to determine that there is a feeding fault, and the fault detection period set when a size of the medium in the feeding direction is a first size is shorter than the fault detection period set when the size of the medium in the feeding direction is a second size larger than the first size.

According to another aspect of the present disclosure, a medium feeding method is implemented by a medium feeding apparatus including a medium mounted section where a medium is mounted, a feed roller feeding the medium mounted on the medium mounted section in a feeding direction, and a movement detection unit located upstream of the feed roller in the feeding direction to output information about a movement of the medium in the feeding direction, and the medium feeding method includes, during a fault detection process to determine that there is a feeding fault when a movement of a subsequent medium in the feeding direction is detected based on detection information of the movement detection unit within a fault detection period that is set after a trailing edge of a preceding medium is detected based on the detection information of the movement detection unit and before feeding of the subsequent medium is started, setting the fault detection period set when a size of the medium in the feeding direction is a first size to be shorter than the fault detection period set when the size of the medium in the feeding direction is a second size larger than the first size.

DESCRIPTION OF EXEMPLARY EMBODIMENTS

The present disclosure is schematically described below.

According to a first aspect of the present disclosure, a medium feeding apparatus includes: a medium mounted section where a medium is mounted; a feed roller feeding the medium mounted on the medium mounted section in a feeding direction; a movement detection unit located upstream of the feed roller in the feeding direction to output information about a movement of the medium in the feeding direction; and a control unit controlling, based on information obtained from the movement detection unit, feeding of the medium, in which when a movement of a subsequent medium in the feeding direction is detected based on detection information of the movement detection unit within a fault detection period that is set after a trailing edge of a preceding medium is detected based on the detection information of the movement detection unit and before feeding of the subsequent medium is started, the control unit is configured to execute a fault detection process to determine that there is a feeding fault, and the fault detection period set when a size of the medium in the feeding direction is a first size is shorter than the fault detection period set when the size of the medium in the feeding direction is a second size larger than the first size.

When a trailing-edge binding fault occurs, a gap between the trailing edge of the preceding medium and a trailing edge of the subsequent medium tends to increase as the preceding medium is fed. In other words, the gap becomes smaller as the medium size of the preceding medium in the feeding direction becomes smaller. According to the present aspect, based on this tendency, in the configuration capable of executing the fault detection process, the fault detection period when the size of the medium in the feeding direction is the first size is set to be shorter than the fault detection period when the size of the medium in the feeding direction is the second size larger than the first size. Thus, reduction of the fault detection period may suppress improper determination based on a disturbance such as vibration.

According to a second aspect of the present disclosure, in the first aspect, the control unit acquires, based on the detection information of the movement detection unit, the size of the medium in the feeding direction.

According to the present aspect, as the control unit acquires the size of the medium in the feeding direction based on the detection information of the movement detection unit, the accurate size of the medium in the feeding direction is expected to be acquired.

According to a third aspect of the present disclosure, a medium feeding apparatus includes: a medium mounted section where a medium is mounted; a feed roller feeding the medium mounted on the medium mounted section in a feeding direction; a movement detection unit located upstream of the feed roller in the feeding direction to output information about a movement of the medium in the feeding direction; and a control unit controlling, based on information obtained from the movement detection unit, feeding of the medium, in which when a movement of a subsequent medium in the feeding direction is detected based on detection information of the movement detection unit within a fault detection period that is set after a trailing edge of a preceding medium is detected based on the detection information of the movement detection unit and before feeding of the subsequent medium is started, the control unit is configured to execute a fault detection process to determine that there is a feeding fault, and the fault detection period when a size of the medium in a width direction intersecting the feeding direction is a first size is shorter than the fault detection period when the size of the medium in the width direction is a second size larger than the first size.

When the trailing-edge binding fault occurs, the trailing edge of the subsequent medium rotates relative to the trailing edge of the preceding medium with a binding position as a starting point, and thus the gap is formed between the trailing edge of the preceding medium and the trailing edge of the subsequent medium. For this reason, the smaller the size of the medium in the width direction is, the smaller the gap is. According to the present aspect, based on this tendency, in the configuration capable of executing the fault detection process, the fault detection period when the size of the medium in the width direction is the first size is set to be shorter than the fault detection period when the size of the medium in the width direction is the second size larger than the first size. Thus, reduction of the fault detection period may suppress improper determination based on a disturbance such as vibration.

According to a fourth aspect of the present disclosure, in the third aspect, a width size detection unit is further included, which is located downstream of the feed roller and is configured to detect the size of the medium in the width direction, and the control unit acquires, based on detection information of the width size detection unit, the size of the medium in the width direction.

According to the present aspect, the width size detection unit is included, which is located downstream of the feed roller and is configured to detect the size of the medium in the width direction, and the control unit acquires the size of the medium in the width direction based on detection information of the width size detection unit so that the size of the medium in the width direction may be properly acquired.

According to a fifth aspect of the present disclosure, in the first aspect, a storage unit storing information is further included, and the storage unit stores the fault detection period for each size of the medium.

According to the present aspect, a storage unit storing information is included, and the storage unit stores the fault detection period for each size of the medium so that the fault detection period may be easily obtained.

According to a sixth aspect of the present disclosure, in the first aspect, the movement detection unit is configured to output information about a movement of the medium in a width direction intersecting the feeding direction, and when a value indicating the movement of the medium in the width direction, acquired by the movement detection unit, exceeds a threshold, the control unit determines that there is a feeding fault.

According to the present aspect, the movement detection unit is configured to output information about a movement of the medium in the width direction intersecting the feeding direction, and the control unit determines that there is a feeding fault when a value indicating the movement of the medium in the width direction, acquired by the movement detection unit, exceeds a threshold so that the rotation of the medium may be detected, particularly, the rotation of the subsequent medium may be detected when the medium at the bottom is fed while the media are bound at a corner portion on the leading edge side.

According to a seventh aspect of the present disclosure, an image reading apparatus includes: a reading unit reading a medium; and the medium feeding apparatus according to the first aspect, feeding the medium toward the reading unit.

According to the present aspect, in the image reading apparatus, the advantage of the first aspect described above may be obtained.

According to an eighth aspect of the present disclosure, a medium feeding method is implemented by a medium feeding apparatus including a medium mounted section where a medium is mounted, a feed roller feeding the medium mounted on the medium mounted section in a feeding direction, and a movement detection unit located upstream of the feed roller in the feeding direction to output information about a movement of the medium in the feeding direction, and the medium feeding method includes, during a fault detection process to determine that there is a feeding fault when a movement of a subsequent medium in the feeding direction is detected based on detection information of the movement detection unit within a fault detection period that is set after a trailing edge of a preceding medium is detected based on the detection information of the movement detection unit and before feeding of the subsequent medium is started, setting the fault detection period when a size of the medium in the feeding direction is a first size to be shorter than the fault detection period when the size of the medium in the feeding direction is a second size larger than the first size.

According to the present aspect, the fault detection period when the size of the medium in the feeding direction is the first size is set to be shorter than the fault detection period when the size of the medium in the feeding direction is the second size larger than the first size. Thus, reduction of the fault detection period may suppress improper determination based on a disturbance such as vibration.

The present disclosure is described below in detail.

A sheet-feed type scanner 1 (hereinafter simply referred to as "scanner") configured to read at least one of front and back surfaces of a document, which is an example of a medium, is described below as an example of an image reading apparatus. Hereinafter, the document is referred to as "document P".

An X-Y-Z coordinate system illustrated in each drawing is an orthogonal coordinate system, in which an X-axis direction is an apparatus width direction and is a document width direction intersecting a document feeding direction. A Y-axis direction is a direction along the document feeding direction, and according to the present embodiment, the Y-axis direction forms an inclination angle with a horizontal direction. A Z-axis direction is a direction perpendicular to the Y-axis direction and generally indicates a direction perpendicular to a surface of the document to be fed and transported.

The downstream in the feeding direction and the transporting direction of the document P is a +Y direction, and the upstream is a −Y direction.

Figure 1:
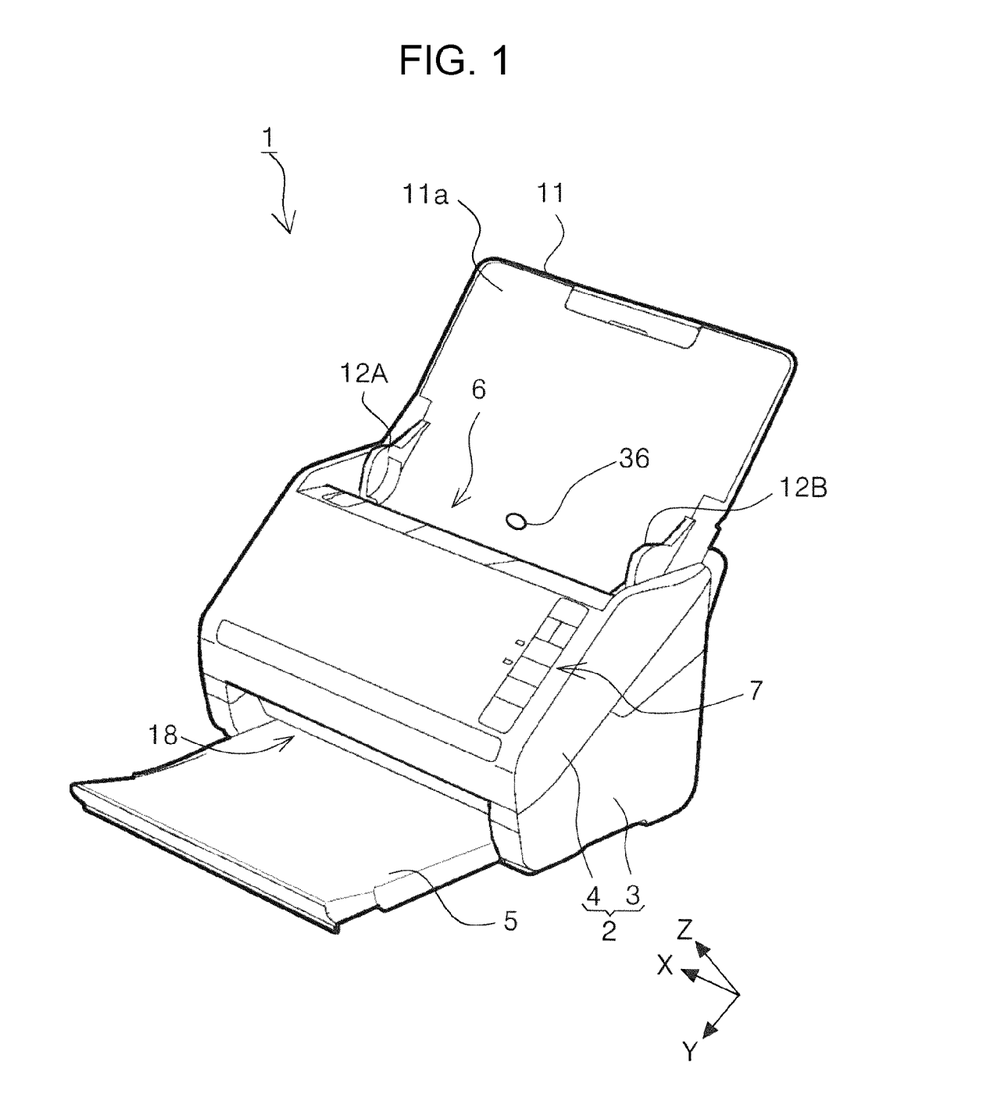
FIG. 1 is an external perspective view of a scanner.

FIG. 1 is an external perspective view of the scanner 1. The scanner 1 includes an apparatus main body 2 having a reader 20 (see FIG. 2) provided therein to read an image of the document P.

The apparatus main body 2 includes a lower unit 3 and an upper unit 4. The upper unit 4 is provided to rotate so as to open/close relative to the lower unit 3 about a rotation shaft (not illustrated) provided in the +Y direction. The upper unit 4 is opened in a direction of the apparatus front surface so that the inside of the apparatus is exposed so as to clear a jam of the document P.

A document mounted section 11 including a mounted surface 11a where the document P to be fed is mounted is provided on a back surface of the apparatus main body 2.

The document mounted section 11 includes a pair of edge guides, that is, edge guides 12A and 12B, which guide side edges of the mounted document P in the width direction. The edge guides 12A and 12B are provided to be displaceable such that the edge guides 12A and 12B are positioned symmetrically in the X-axis direction with respect to a center position CL (see FIG. 3) in the width direction of the mounted surface 11a.

The apparatus main body 2 includes, on the apparatus front surface of the upper unit 4, an operation panel 7 for performing operations for various reading settings and reading execution.

An upper portion of the upper unit 4 includes a feed port 6 communicating with the inside of the apparatus main body 2, and the document P mounted on the document mounted section 11 is fed toward the reader 20 by a document feeding apparatus 10 described below. The read document P is discharged toward a discharge tray 5 through a discharge port 18 provided on a front surface of the lower unit 3.

Next, a document feed path in the scanner 1 is described with reference to FIGS. 2 and 3. The scanner 1 includes the document feeding apparatus 10. The document feeding apparatus 10 includes the document mounted section 11 where the document P is mounted, a feed roller 14 that feeds the document P mounted on the document mounted section 11, a separation roller 15 that separates the document P, a controller 40 (see FIG. 4) that is an example of a control unit, and a two-dimensional sensor 36 that is an example of a movement detection unit.

The document feeding apparatus 10 may be regarded as an apparatus obtained by omitting, from the scanner 1, a function related to document reading, that is, the reader 20 described below. Even though the reader 20 is included, the scanner 1 itself may be regarded as a document feeding apparatus when focused on the perspective of document feeding.

Figure 2:
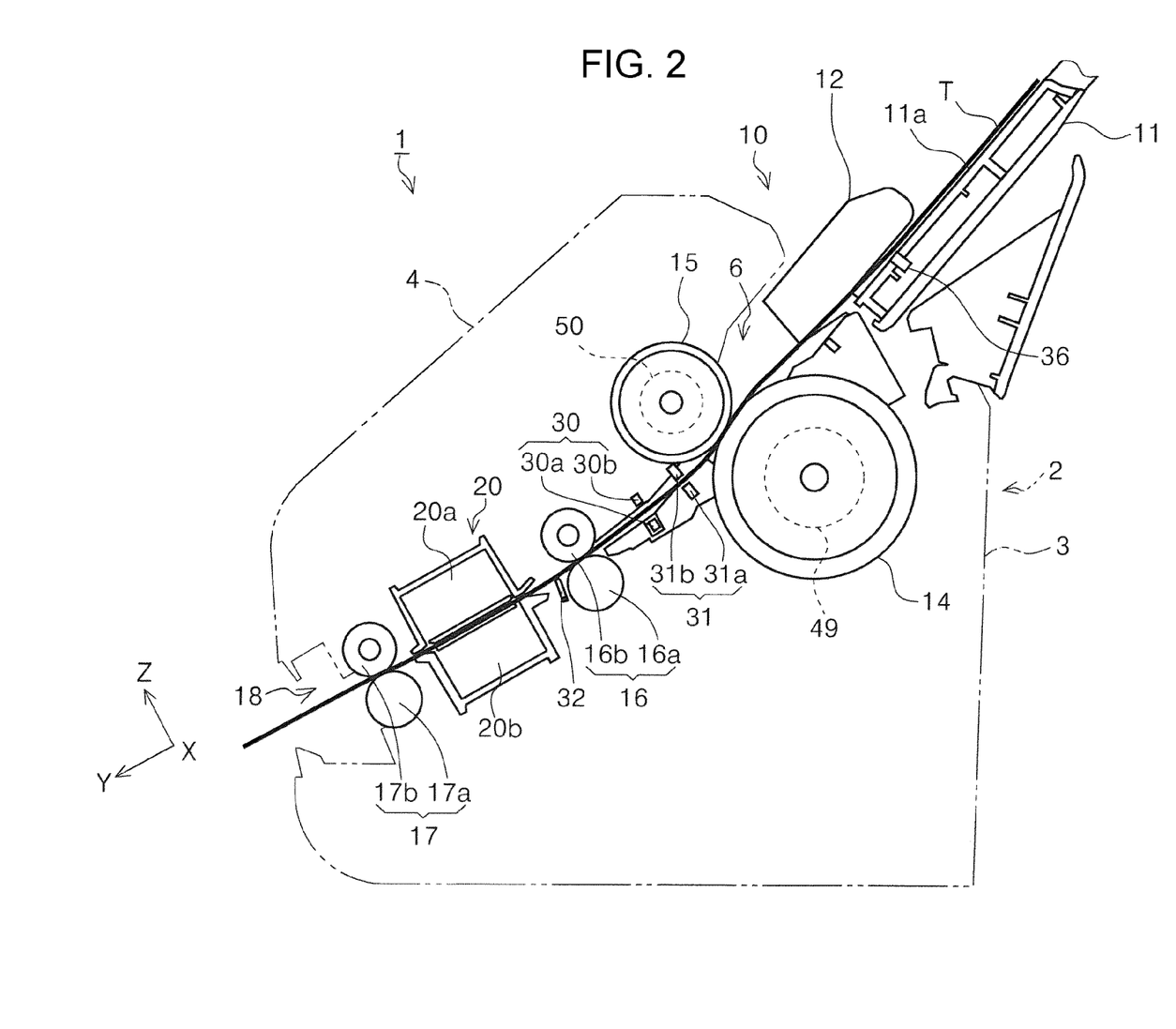
FIG. 2 is a side sectional view of a document transport path of the scanner.

In FIG. 2, a solid line denoted by a reference mark T indicates a document feed path, in other words, a passing trajectory of the document P to be fed and transported.

The document mounted section 11 is provided on the most upstream of the document feed path T. On the downstream of the document mounted section 11, the feed roller 14 is provided to feed the document P on the mounted surface 11a of the document mounted section 11 toward the reader 20, and the separation roller 15 is provided to nip the document P with the feed roller 14 and separates the document P.

The feed roller 14 is in contact with the document P at the bottom among the documents P mounted on the mounted surface 11a of the document mounted section 11. Therefore, when the documents P are set on the document mounted section 11 in the scanner 1, the document P on the side of the mounted surface 11a is sequentially fed downstream.

Figure 3:
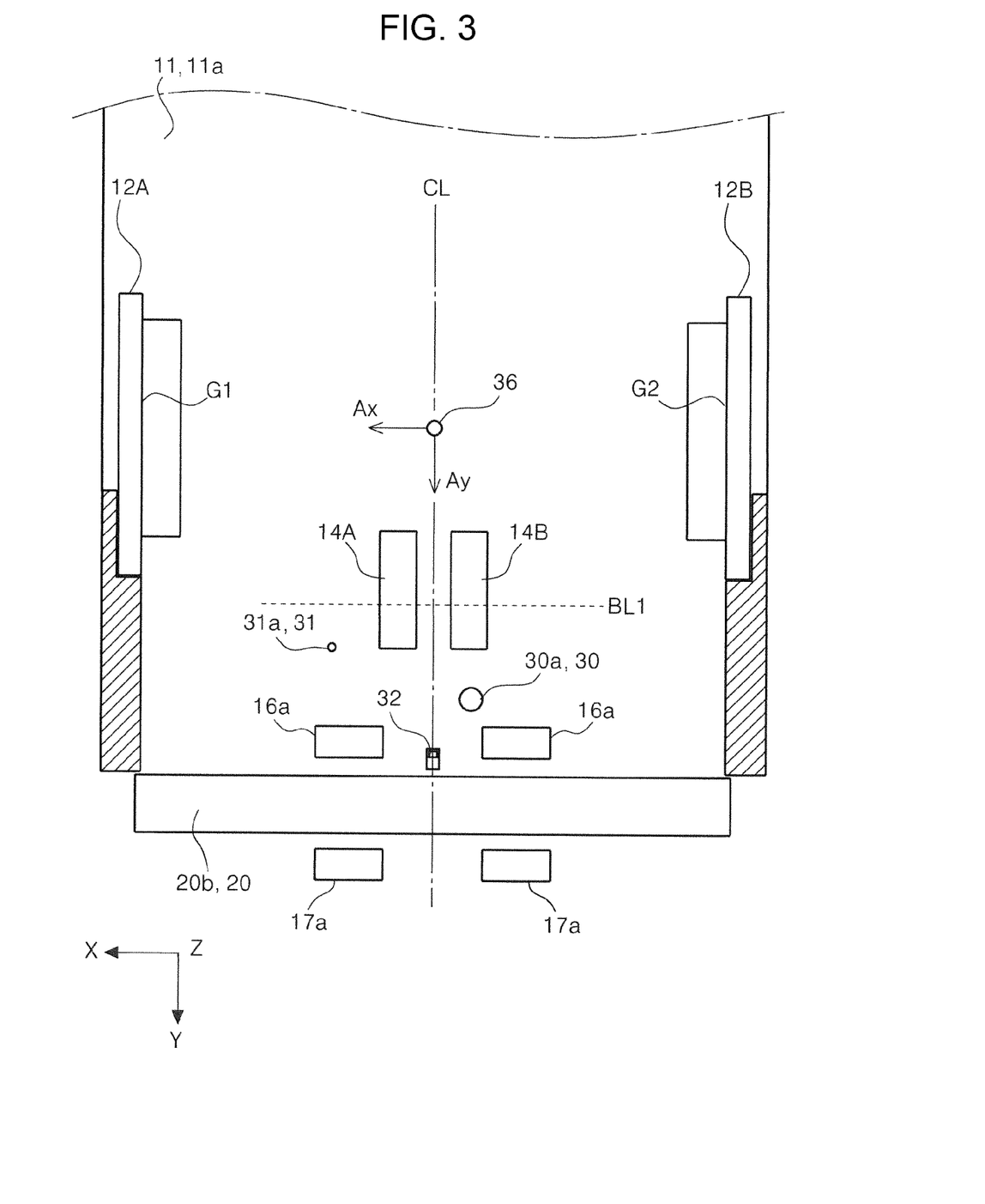
FIG. 3 is a plan view of the document transport path of the scanner.

According to the present embodiment, as illustrated in FIG. 3, the feed rollers 14 are positioned symmetrically with respect to the center position CL in the X-axis direction. In FIG. 3, the left feed roller 14 and the right feed roller 14 with respect to the center position CL are denoted by reference marks 14A and 14B, respectively. Similarly, although not illustrated, the separation rollers 15 include the left separation roller and the right separation roller with respect to the center position CL.

In FIG. 3, a broken line BL1 indicates a document nip position between the feed roller 14 and the separation roller 15.

Figure 4:
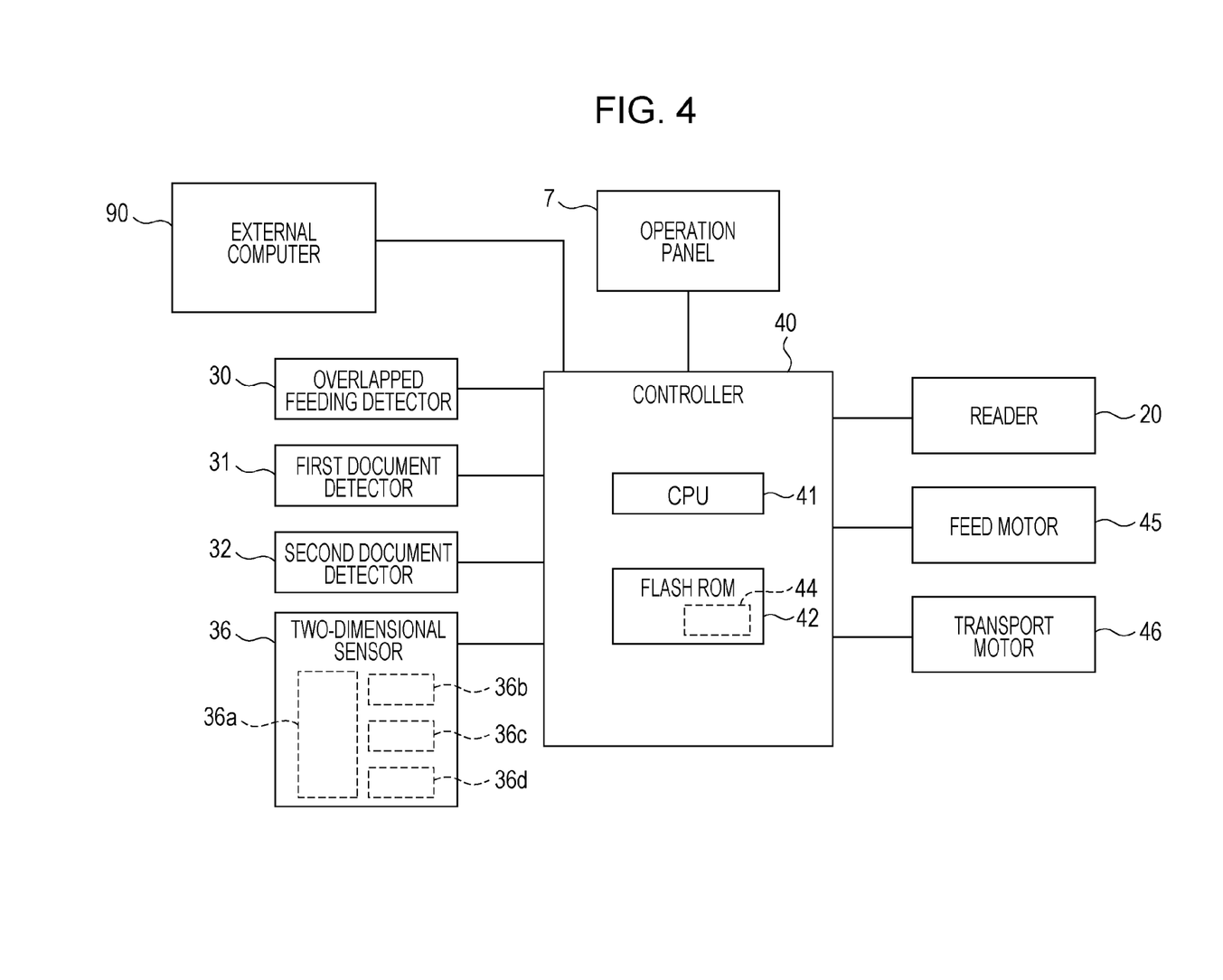
FIG. 4 is a block diagram illustrating a control system of the scanner.

The feed roller 14 is driven to rotate by a feed motor 45 (see FIG. 4). The feed roller 14 rotates in a counterclockwise direction in FIG. 2 due to the rotation torque obtained from the feed motor 45.

A one-way clutch 49 is provided in a driving force transmission path between the feed roller 14 and the feed motor 45 (see FIG. 4). Therefore, even when the feed motor 45 rotates in the reverse direction, the feed roller 14 does not rotate in the reverse direction. When the feed motor 45 is in a stopped state, the feed roller 14 is in contact with the document P being transported so as to rotate together in the counterclockwise direction in FIG. 2.

For example, when a second document detector 32 located downstream of a pair of transport rollers 16 detects the leading edge of the document P, the controller 40 stops driving the feed motor 45 and drives only a transport motor 46. Accordingly, the pair of transport rollers 16 transport the document P, and the feed roller 14 is in contact with the transported document P and rotates together in the counterclockwise direction in FIG. 2.

Furthermore, the transport motor 46 (see FIG. 4) transmits rotational torque to the separation roller 15 via a torque limiter 50. During a feeding operation of the document P, the transport motor 46 (see FIG. 4) transmits, to the separation roller 15, a driving torque for rotating the separation roller 15 in the counterclockwise direction in FIG. 2.

When the document P is not present or only the one document P is present between the feed roller 14 and the separation roller 15, the rotational torque for rotating the separation roller 15 in the clockwise direction in FIG. 2 exceeds the limit torque of the torque limiter 50, which causes slippage in the torque limiter 50, and thus the separation roller 15 rotates together in the clockwise direction in FIG. 2 regardless of the rotational torque received from the transport motor 46 (see FIG. 4).

On the other hand, when the second and subsequent documents P in addition to the document P to be fed enter between the feed roller 14 and the separation roller 15, slippage occurs between the documents, and thus the separation roller 15 rotates in the counterclockwise direction in FIG. 2 due to the driving torque received from the transport motor 46 (see FIG. 4). Accordingly, the second and subsequent documents P, which are about to be fed overlapped, are returned upstream, that is, overlapped feeding is prevented.

The pair of transport rollers 16, the reader 20 that reads an image, and a pair of discharge rollers 17 are provided downstream of the feed roller 14. The pair of transport rollers 16 include a transport drive roller 16a that is driven to rotate by the transport motor 46 (see FIG. 4) and a transport idler roller 16b that rotates together. According to the present embodiment, as illustrated in FIG. 3, the two transport drive rollers 16a are positioned symmetrically with respect to the center position CL. Similarly, although not illustrated in FIG. 3, the transport idler rollers 16b are also positioned symmetrically with respect to the center position CL.

After the document P is nipped by the feed roller 14 and the separation roller 15 and is fed downstream, the document P is nipped by the pair of transport rollers 16 and is transported to the reader 20 located downstream of the pair of transport rollers 16.

The reader 20 includes an upper read sensor 20a provided on the side of the upper unit 4 and a lower read sensor 20b provided on the side of the lower unit 3. According to the present embodiment, the upper read sensor 20a and the lower read sensor 20b are configured as a contact image sensor module (CISM) as an example.

After an image on at least one of the front and back surfaces of the document P is read by the reader 20, the document P is nipped by the pair of discharge rollers 17 located downstream of the reader 20 and is discharged through the discharge port 18 provided on the apparatus front surface of the lower unit 3.

The pair of discharge rollers 17 include a discharge drive roller 17a that is driven to rotate by the transport motor 46 (see FIG. 4) and a discharge idler roller 17b that rotates together. According to the present embodiment, as illustrated in FIG. 3, the two discharge drive rollers 17a are positioned symmetrically with respect to the center position CL. Similarly, although not illustrated in FIG. 3, the two discharge idler rollers 17b are positioned symmetrically with respect to the center position CL.

A control system in the scanner 1 is described below with reference to FIG. 4. FIG. 4 is a block diagram illustrating the control system of the scanner 1 according to the present disclosure.

In FIG. 4, the controller 40 serving as a control unit performs various controls on the scanner 1, including the control on feeding, transporting, and discharging and the control on reading of the document P. A signal from the operation panel 7 is input to the controller 40.

The controller 40 controls the feed motor 45 and the transport motor 46. The feed motor 45 and the transport motor 46 are both DC motors according to the present embodiment.

The controller 40 receives input of read data from the reader 20 and transmits, to the reader 20, a signal for controlling the reader 20.

The controller 40 also receives input of signals from the two-dimensional sensor 36, an overlapped feeding detector 30, a first document detector 31, the second document detector 32, described below, and other detection unit described below.

The controller 40 also receives input of detection values of an encoder that detects the amount of rotation of the feed motor 45 and an encoder that detects the amounts of rotation of the transport drive roller 16a and the discharge drive roller 17a. Thus, the controller 40 may determine a document feeding amount by each roller.

The controller 40 includes a central processing unit (CPU) 41 and a flash read only memory (ROM) 42. The flash ROM is a readable and writable nonvolatile memory. The CPU 41 performs various types of arithmetic processing in accordance with a program 44, parameters, and the like, stored in the flash ROM 42 to control the overall operation of the scanner 1. Here, the program 44 does not necessarily refer to one program. The program 44 includes a plurality of programs, including a program for performing a fault detection process described below and also including, for example, various control programs needed to feed, transport, and read the document P.

The scanner 1 is configured to connect to an external computer 90, and information is input to the controller 40 from the external computer 90. The external computer 90 includes a display (not illustrated). The display implements a user interface (UI) by a control program stored in a storage unit (not illustrated) included in the external computer 90.

Next, each detection unit provided in the document feed path T is described.

The document mounted section 11 includes the two-dimensional sensor 36 as a movement detection unit. The two-dimensional sensor 36 is configured to be opposed to the document P at the bottom among the documents P mounted on the document mounted section 11.

The two-dimensional sensor 36 is a sensor based on the principle same as or similar to that of a sensor configured to detect a movement of a detection target in a two-dimensional coordinate system used for a computer mouse. The two-dimensional sensor 36 includes a controller 36*a*, a light source 36*b*, a lens 36*c*, and an image sensor 36*d*.

The light source 36*b* is a light source that irradiates the document P mounted on the document mounted section 11 with light via the lens 36*c*. For example, a light source such as a red light emitting diode (LED), an infrared LED, a laser, or a blue LED may be used. According to the present embodiment, laser light is used. The light source 36*b* may switch between a light emitting state and a non-light emitting state under the control of the controller 40.

The lens 36*c* guides the light emitted from the light source 36*b* toward the document P mounted on the document mounted section 11 to irradiate the document P with the light.

The image sensor 36*d* is a sensor that receives light reflected from the document P mounted on the document mounted section 11, and an image sensor such as a complementary metal-oxide semiconductor (CMOS) sensor or a charge-coupled device (CCD) sensor may be used. The image sensor 36*d* has pixels arranged along a first axis direction Ay and a second axis direction Ax perpendicular to the first axis direction Ay. The first axis direction Ay and the second axis direction Ax are illustrated in FIG. 3, and according to the present embodiment, the first axis direction Ay is a direction parallel to the Y-axis direction, and the second axis direction Ax is a direction parallel to the X-axis direction. The first axis direction Ay is an example of a first direction, and the second axis direction Ax is an example of a second direction.

In this description, the "first axis direction Ay" does not refer to either a +Ay direction or a −Ay direction, but refers to both directions. Similarly, the "second axis direction Ax" does not refer to either a +Ax direction or a −Ax direction, but refers to both directions.

The controller 36*a* analyzes an image acquired by the image sensor 36*d* and outputs, as detection values, a movement amount Wy of the image in the first axis direction Ay and a movement amount Wx of the image in the second axis direction Ax. A known method used for a computer mouse may be used as an image analysis technique by the controller 36*a*.

The controller 40, which acquires the movement amounts Wy and Wx from the two-dimensional sensor 36, uses the acquired movement amounts Wy and Wx to determine the movement of the document P being fed. The two-dimensional sensor 36 according to the present embodiment outputs the movement amounts Wy and Wx to the controller 40, and the output value is reset to zero in accordance with an initialization instruction from the controller 40.

By acquiring the movement amount Wy, the controller 40 may determine whether the document P is moving in the first axis direction Ay at the position of the two-dimensional sensor 36. By acquiring the movement amount Wx, the controller 40 may determine whether the document P is moving in the second axis direction Ax at the position of the two-dimensional sensor 36.

Although the optical two-dimensional sensor 36 is described as an example, a mechanical sensor may be used, more specifically, a sensor including a trackball, a rotary encoder that detects the rotation of the trackball in the first axis direction Ay, and a rotary encoder that detects the rotation of the trackball in the second axis direction Ax may be used. The use of the optical sensor as the two-dimensional sensor 36 enables more accurate detection of the movement of the document P.

Although the single two-dimensional sensor 36 acquires the movement amount Wy, which is a detection value in the first axis direction Ay, and the movement amount Wx, which is a detection value in the second axis direction Ax according to the present embodiment, a sensor that acquires the detection value in the first axis direction Ay and a sensor that acquires the detection value in the second axis direction Ax may be separately provided.

The first document detector 31 is provided near the downstream of the feed roller 14. The first document detector 31 is configured as for example an optical sensor. The first document detector 31 includes a light emitter 31*a* and a light receiver 31*b* that are opposed to each other with the document feed path T interposed therebetween as illustrated in FIG. 2. The light receiver 31*b* transmits the electric signal indicating the intensity of detection light to the controller 40. When the transported document P blocks the detection light emitted from the light emitter 31*a*, the electric signal indicating the intensity of the detection light changes and thus the controller 40 may detect the passage of the leading edge or the trailing edge of the document P.

The overlapped feeding detector 30 that detects overlapped feeding of the documents P is provided downstream of the first document detector 31. The overlapped feeding detector 30 includes an ultrasound transmitter 30*a* and an ultrasound receiver 30*b* that are opposed to each other with the document feed path T interposed therebetween, as illustrated in FIG. 2. The ultrasound receiver 30*b* receives ultrasound and transmits, to the controller 40, the output value corresponding to the intensity of the detected ultrasound. When the documents P are fed overlapped, the electric signal indicating the intensity of the ultrasound changes and thus the controller 40 may detect overlapped feeding of the documents P.

The second document detector 32 is provided downstream of the overlapped feeding detector 30 and further downstream of the pair of transport rollers 16. The second document detector 32 is configured as a contact sensor including a lever. When the lever rotates due to the passage of the leading edge or the trailing edge of the document P, an electric signal transmitted from the second document detector 32 to the controller 40 changes, and thus the controller 40 may detect the passage of the leading edge or the trailing edge of the document P.

The first document detector 31 and the second document detector 32 described above allow the controller 40 to determine the position of the document P in the document feed path T.

Next, a feeding fault process using the two-dimensional sensor 36 is described.

The controller 40 determines the presence of a feeding fault based on the detection value of the two-dimensional sensor 36, and when a predetermined condition is satisfied, stops feeding and transporting the document P as a result of the occurrence of the feeding fault. According to the present embodiment, specifically, the feed motor 45 and the transport motor 46 are stopped.

Examples of the feeding fault include a fault caused by feeding the bound documents P that are mounted on the document mounted section 11. This feeding fault includes a trailing-edge binding fault when the documents P are bound on the trailing edge side and a leading-edge binding fault when the documents P are bound on the leading edge side.

Figure 5:
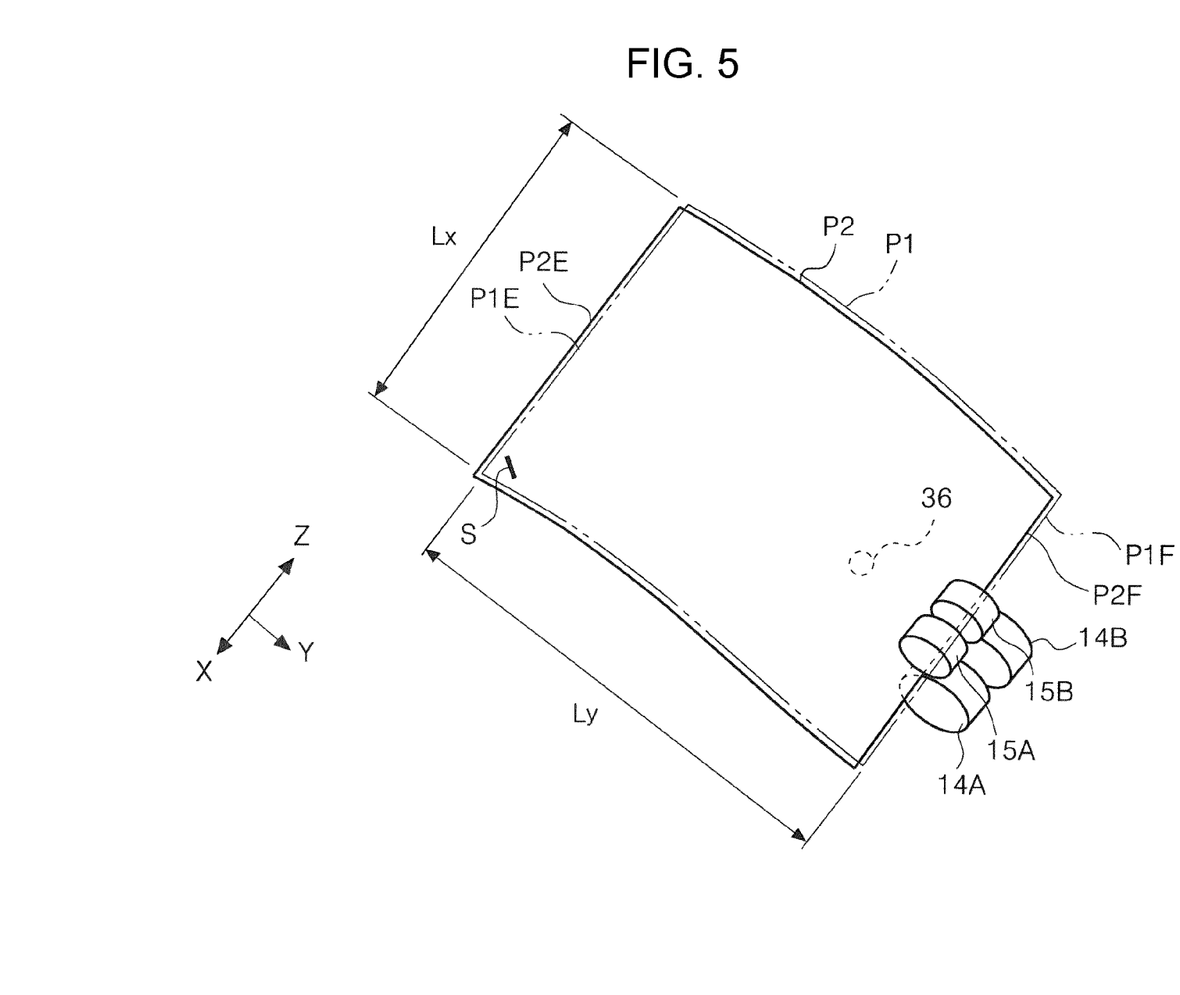
FIG. 5 is a schematic diagram illustrating a phenomenon that occurs when documents bound with a staple are fed.
Figure 6:
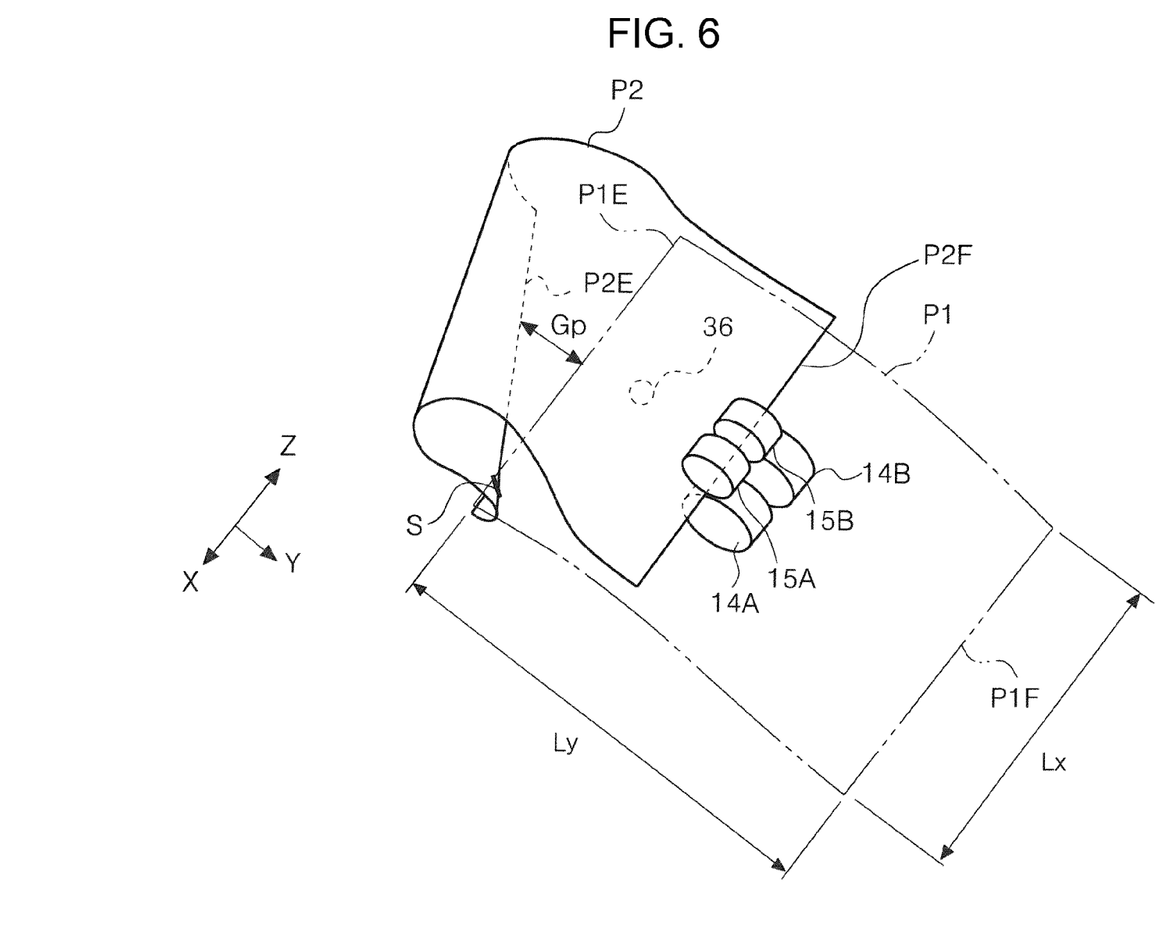
FIG. 6 is a schematic diagram illustrating the phenomenon that occurs when the documents bound with the staple are fed.

FIGS. 5 and 6 illustrate the trailing-edge binding fault. A reference mark P1 denotes the document that is located at the bottom and is fed in contact with the feed roller 14, and a reference mark P2 denotes a document mounted on the document at the bottom. Hereinafter, the document at the bottom indicated by the reference mark P1 is referred to as "preceding document P1", and the document mounted thereon is referred to as "subsequent document P2". The preceding document P1 is indicated in an alternate long and two short dashes line, and the subsequent document P2 is indicated in a solid line.

In FIGS. 5 and 6, a reference mark P1F denotes a feeding-direction downstream edge, that is, leading edge, of the preceding document P1, and a reference mark P1E denotes a feeding-direction upstream edge, that is, trailing edge, of the preceding document P1. A reference mark P2F denotes a feeding-direction downstream edge, that is, leading edge, of the subsequent document P2, and a reference mark P2E denotes a feeding-direction upstream edge, that is, trailing edge, of the subsequent document P2.

The preceding document P1 and the subsequent document P2 are bound with a staple S at a corner portion in the +X direction on the upstream in the feeding direction, that is, on the trailing edge side. When the preceding document P1 is fed downstream in the feeding direction by the feed roller 14 in this state, only the trailing edge P2E of the subsequent document P2 moves downstream while the leading edge P2F is stopped by the separation roller 15, and thus the subsequent document P2 becomes curved upward as illustrated in FIG. 6. Further, a trailing edge region of the subsequent document P2 is turned over, and a gap Gp in the Y-axis direction is formed between the trailing edge P2E of the subsequent document P2 and the trailing edge P1E of the preceding document P1. Although the gap Gp varies depending on a position in the X-axis direction, the gap Gp illustrated in FIG. 6 is a gap at the installation position of the two-dimensional sensor 36 in the X-axis direction.

Accordingly, when the controller 40 detects the gap Gp, in other words, detects the trailing edge P2E of the subsequent document P2, based on the detection value, that is, the movement amount Wy, of the two-dimensional sensor 36 in the first axis direction Ay even though the feeding operation of the subsequent document P2 is not being performed, it is determined that a trailing-edge binding fault has occurred and stops document feeding.

In FIGS. 5 and 6, a reference mark Lx denotes a document size in the width direction, and a reference mark Ly denotes a document size in the document feeding direction. The trailing edge P2E of the subsequent document P2 rotates about the position of the staple S and thus the gap Gp is formed. Therefore, the gap Gp tends to be larger as the document size Lx in the width direction becomes larger.

Furthermore, the gap Gp becomes larger as the preceding document P1 moves downstream. Therefore, the gap Gp tends to be larger as the document size Ly in the document feeding direction becomes larger.

In the case of the leading-edge binding fault when the documents P are bound at the leading edge side, the subsequent document P2 is rotated about the position of the staple S, although not illustrated. Therefore, when the detection value, that is, the movement amount Wx, of the two-dimensional sensor 36 in the second axis direction Ax exceeds a predetermined threshold, the controller 40 may determine that a leading-edge binding fault has occurred and may stop document feeding.

Figure 7:
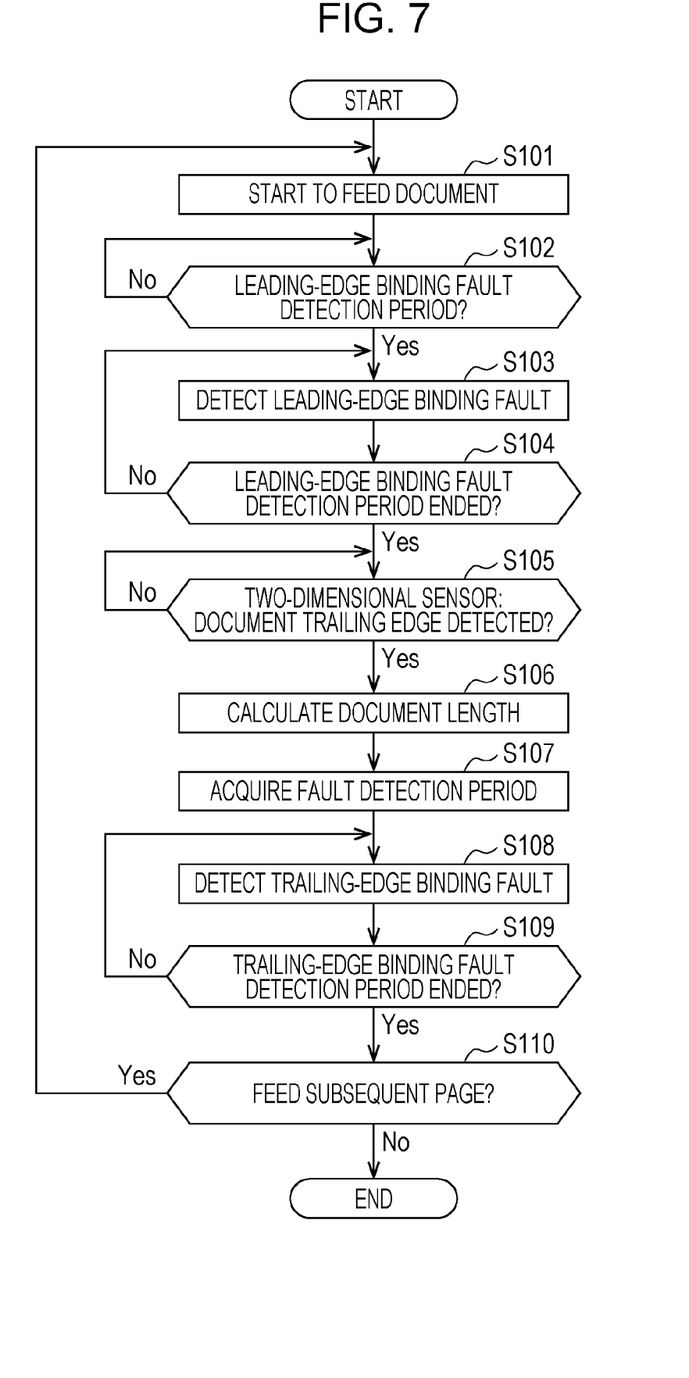
FIG. 7 is a flowchart illustrating a flow of a fault detection process.
Figure 8:
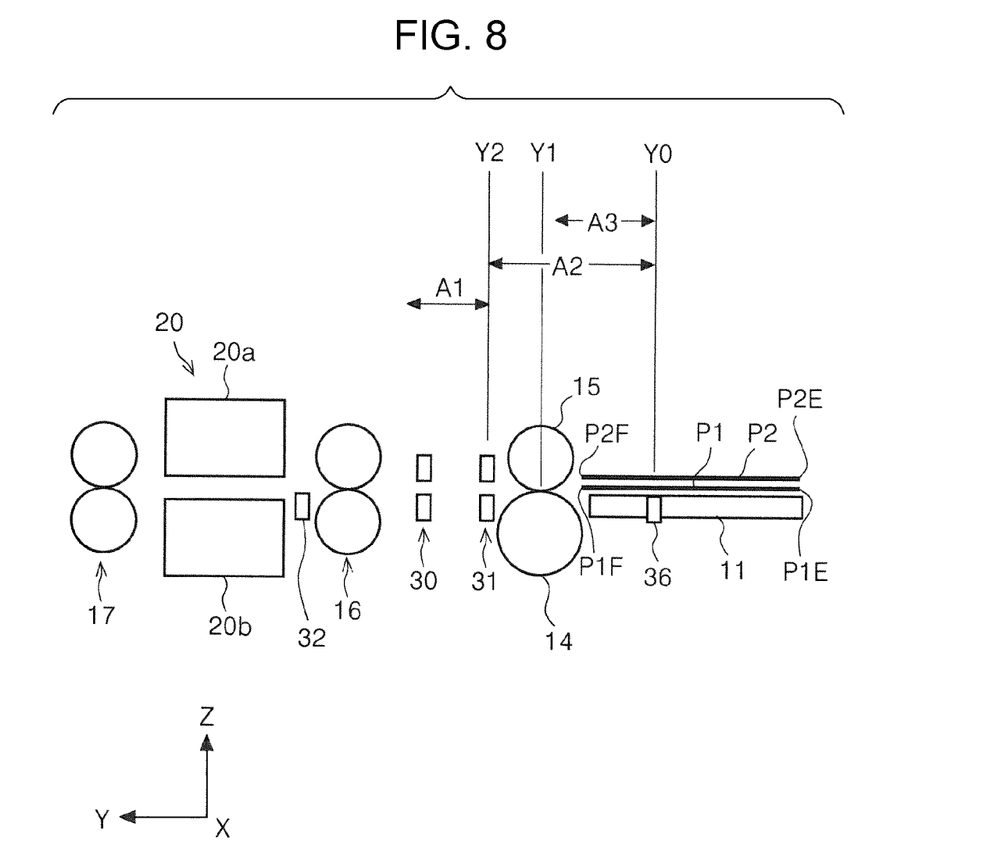
FIG. 8 is a diagram schematically illustrating the document transport path of the scanner.
Figure 9:
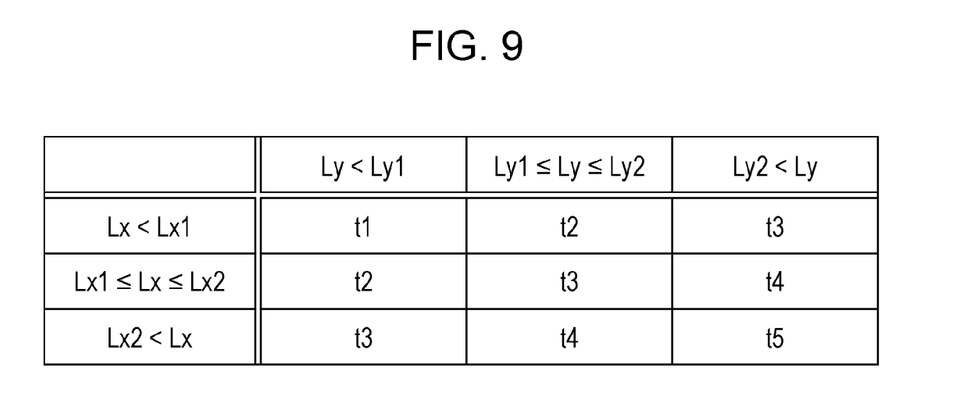
FIG. 9 is a table illustrating a setting example of a fault detection period.

Next, the flow of a feeding fault detection process is described with reference to FIGS. 7 to 9. FIG. 8 schematically illustrates the document feed path illustrated in FIG. 2. A position Y0 in the document feeding direction is a detection position by the two-dimensional sensor 36, a position Y1 is a nip position between the feed roller 14 and the separation roller 15, and a position Y2 is a detection position by the first document detector 31. Reference marks A1 to A3 denote sections in the document feed path.

When a document feeding start command is received, the controller 40 starts to rotate the feed motor 45 (see FIG. 4) and the transport motor 46 (see FIG. 4) and starts to feed the preceding document P1 (Step S101).

In FIG. 8, the section A1 is a section for detecting a leading-edge binding fault and is a section where the leading edge P1F of the preceding document P1 moves by a predetermined distance after the leading edge P1F is detected by the first document detector 31 (Yes at Step S102). According to the present embodiment, the downstream position of the section A1 is set on the upstream of the pair of transport rollers 16.

The controller 40 detects a leading-edge binding fault when the leading edge P1F of the preceding document P1 moves in the section A1 (Step S103 and No at S104). When the leading-edge binding fault is detected here, the controller 40 stops the feed motor 45 and the transport motor 46.

As described above, when the movement amount Wx, which is a value that is acquired by the two-dimensional sensor 36 and that indicates the movement of the document P in the width direction, exceeds the threshold, the controller 40 determines that there is a leading-edge binding fault, that is, a feeding fault, so as to appropriately determine a state where the documents P are bound at the corner portion on the leading edge side.

Subsequently, when the leading edge P1F of the preceding document P1 has passed the section A1 without detecting a leading-edge binding fault, that is, when a leading-edge binding fault detection period has ended (Yes at Step S104), the controller 40 monitors the passage of the trailing edge P1E of the preceding document P1 based on a detection signal of the two-dimensional sensor 36 (Step S105).

When the two-dimensional sensor 36 has detected the passage of the trailing edge P1E of the preceding document P1 (Yes at Step S105), the document length is calculated based on the information (Step S106). Here, the document length is the document size Ly illustrated in FIGS. 5 and 6. The document size Ly may be obtained by, for example, adding the path length between the position Y0 and the position Y2 to a document feeding amount after the first document detector 31 detects the leading edge P1F of the preceding document P1.

Subsequently, based on the acquired document size Ly, the controller 40 acquires the maximum length of a fault detection period for detecting a trailing-edge binding fault, that is, the time for detecting a trailing-edge binding fault (Step S107). As described above, the controller 40 sets the fault detection period for the subsequent document P2 based on the document size Ly obtained when the preceding document P1 is fed. The fault detection period is a value corresponding to the document size Ly and is previously stored in the flash ROM 42 (see FIG. 4), which is an example of a storage unit.

According to the present embodiment, the fault detection period for detecting the trailing-edge binding fault is, for example, a period during which the trailing edge P1E of the preceding document P1 moves in the section A3 illustrated in FIG. 8. The section A3 is a section in which the trailing edge P1E of the preceding document P1 moves from the position Y0 to the downstream by a predetermined distance.

According to the present embodiment, the above-described section A3 is set within a period during which the trailing edge P1E of the preceding document P1 moves in the section A2 illustrated in FIG. 8. The section A2 is a section between the position Y0 and the position Y2.

Specifically, as the controller 40 starts to feed the subsequent document P2 when the first document detector 31 detects the trailing edge P1E of the preceding document P1, the section A3 may refer to a section during which the trailing edge P1E of the preceding document P1 moves from when the two-dimensional sensor 36 detects the trailing edge P1E of the preceding document P1 to when feeding of the subsequent document P2 is started.

According to the present embodiment, the fault detection period starts when the two-dimensional sensor 36 detects the trailing edge P1E of the preceding document P1. That is, according to the present embodiment, the start position of the section A3 matches the start position of the section A2. The present disclosure is not limited thereto, and the start position of the section A3 may be downstream of the start position of the section A2. Specifically, the fault detection period may start after a certain time has elapsed from the time when the two-dimensional sensor 36 detects the trailing edge P1E of the preceding document P1.

Subsequently, the controller 40 detects a trailing-edge binding fault during the acquired fault detection period (Step S108 and No at S109). The process at Steps S108 and S109 includes the fault detection process to determine that there is a feeding fault when a movement of the subsequent document P2 is detected. When the trailing-edge binding fault is detected at this point, the controller 40 stops the feed motor 45 and the transport motor 46.

Conversely, after the fault detection period ends without detecting a trailing-edge binding fault (Yes at Step S109), the controller 40 returns to Step S101 when there is a subsequent page (Yes at Step S110) and ends the process when there is no subsequent page (No at Step S110). The presence of the subsequent page may be determined based on a detection value of the two-dimensional sensor 36, or the presence of the document on the document mounted section 11 may be determined by a sensor that is separately provided.

Here, the fault detection period at Step S107 is set in accordance with the document size Ly in the document feeding direction. Specifically, to detect the trailing-edge binding fault, the movement of the subsequent document P2 is monitored during the fault detection period, and it is determined that there is the trailing-edge binding fault when it is determined that the subsequent document P2 has moved, and therefore, when the subsequent document P2 has moved due to a disturbance such as vibration, it may be improperly determined that there is the trailing-edge binding fault even though there is no trailing-edge binding fault. Therefore, it is preferable to minimize the fault detection period.

As described above, when the trailing-edge binding fault occurs, the gap Gp between the trailing edge P1E of the preceding document P1 and the trailing edge P2E of the subsequent document P2 tends to increase as the preceding document P1 is fed. In other words, the gap Gp becomes smaller as the document size Ly in the document feeding direction becomes smaller.

According to the present embodiment, based on this tendency, when the document size Ly in the document feeding direction is a first size, the fault detection period at Step S107 is set to be shorter than that when the document size Ly is a second size larger than the first size. Thus, reduction of the fault detection period may suppress improper determination based on a disturbance such as vibration.

Mixed documents having different sizes may be set on the document mounted section 11, and in this case, when the fault detection period is fixed, it may be difficult to set an appropriate fault detection period corresponding to the size. However, as described above, the controller 40 sets the fault detection period for the subsequent document P2 based on the document size Ly obtained when the preceding document P1 is fed, and therefore an appropriate fault detection period may be set even when the document size is changed halfway. Such an operational advantage may be desirably achieved when the document size Ly of the preceding document P1 is acquirable at earlier timing as in the configuration where the document mounted section 11 includes the movement detection unit.

According to the present embodiment, the document size Ly in the document feeding direction is acquired based on the detection information of the two-dimensional sensor 36. Therefore, the accurate document size Ly is expected to be acquired.

The document size Ly in the document feeding direction may be acquired by using a dedicated sensor that is separately provided in the document mounted section 11 or may be acquired using any of the first document detector 31, the second document detector 32, and the reader 20. For example, when the document size Ly is acquired by using a detection unit on the downstream of the feed roller 14 while the document P of a first page is fed, the fault detection process for the document P of a second page may use a predetermined fault detection period. Then, the fault detection period may be set for the documents P of third and subsequent pages based on the document size Ly obtained when the first page is fed.

Alternatively, when the user has input document size information via the operation panel 7, the document size Ly may be acquired based on the document size information.

As described with reference to FIGS. 5 and 6, the gap Gp also depends on the document size Lx in the width direction. That is, as the document size Lx in the width direction becomes larger, the gap Gp becomes larger. Therefore, when the document size Lx in the width direction is the first size, the fault detection period at Step S107 may be set to be shorter than that when the document size Lx is the second size larger than the first size. Thus, reduction of the fault detection period may suppress improper determination based on a disturbance such as vibration.

The fault detection period may be set based on a combination of the document size Ly in the document feeding direction and the document size Lx in the width direction. FIG. 9 illustrates an example thereof, in which t1 to t5 indicate lengths of the fault detection periods and the lengths are set as t1<t2<t3<t4<t5.

In a case in which the document size Ly in the document feeding direction is less than Ly1, t1 is used as the fault detection period when the document size Lx in the width direction is less than Lx1, t2 is used as the fault detection period when the document size Lx in the width direction is equal to or more than Lx1 and equal to or less than Lx2, and t3 is used as the fault detection period when the document size Lx in the width direction is more than Lx2.

Similarly, when the document size Ly in the document feeding direction is equal to or more than Ly1 and equal to or less than Ly2, any of the fault detection periods t2, t3, and t4 is used in accordance with the document size Lx in the width direction. When the document size Ly in the document feeding direction is more than Ly2, any of the fault detection periods t3, t4, and t5 is used in accordance with the document size Lx in the width direction.

As described above, the fault detection period is set based on a combination of the document size Ly in the document feeding direction and the document size Lx in the width direction so as to set the fault detection period more appropriately.

The document size Lx in the width direction may be acquired from a document image read by the reader 20. In this case, the reader 20 is located downstream of the feed roller 14 to function as a width size detection unit configured to detect the document size Lx in the width direction.

The present disclosure is not limited thereto, and the document size Lx in the width direction may be acquired by using a dedicated sensor that is provided separately from the reader 20. In this case, the dedicated sensor may be located downstream or upstream of the feed roller 14. A detection unit that detects the positions of the edge guides 12A and 12B (see FIGS. 1 and 3) may be provided, and the document size Lx in the width direction may be acquired based on detection information of the detection unit.

According to the present embodiment, as the fault detection period is stored in the flash ROM 42 (see FIG. 4), which is an example of a storage unit, for each document size, the fault detection period may be easily obtained. For example, the fault detection period may be set and stored for each size of the A and B series defined by the international standard ISO 216.

The present disclosure is not limited thereto, and an acquired document size is applied to a predetermined calculation formula so that the fault detection period may be calculated and set.

When the trailing edge P1E of the preceding document P1 passes through the position Y1 in FIG. 8, that is, when the trailing edge P1E of the preceding document P1 passes through the nip position between the feed roller 14 and the separation roller 15, a vibration occurs, which may cause improper detection during the detection of a trailing-edge binding fault. The smaller the document size is, the more likely the vibration is to occur when the trailing edge P1E of the preceding document P1 passes through the nip position between the feed roller 14 and the separation roller 15. Here, the document size refers to both the document size Ly in the feeding direction and the document size Lx in the width direction and may also be expressed as the area of the document. For example, a document having an A6 size defined by the international standard ISO 216 tends to cause a vibration as compared to a document having an A4 size when the trailing edge P1E passes through the nip position between the feed roller 14 and the separation roller 15.

In consideration of the above-described tendency, it is preferable to set the fault detection period for detecting the trailing-edge binding fault so as not to include the timing at which the trailing edge of the document passes through the nip position between the feed roller 14 and the separation roller 15 when the document size is less than a predetermined size, for example. Accordingly, it is possible to reduce improper detection when the trailing-edge binding fault is detected.

Conversely, it is also preferable to set the fault detection period for detecting the trailing-edge binding fault so as to include the timing at which the trailing edge of the document passes through the nip position between the feed roller 14 and the separation roller 15 when the document size is equal to or more than the predetermined size. This improves the flexibility in setting the fault detection period.

It is needless to say that the present disclosure is not limited to the above-described embodiment, various modifications are possible within the scope of the disclosure described in claims, and these modifications are also included in the scope of the present disclosure.

For example, providing the two-dimensional sensor 36 makes it possible to relatively accurately determine the timing at which the trailing edge of the document P passes through the nip position (the position Y1 in FIG. 8) between the feed roller 14 and the separation roller 15. By taking advantage of this, for example, in order to suppress a change in the document feeding amount at the timing when the trailing edge of the document P passes through the nip position between the feed roller 14 and the separation roller 15, it is also preferable to perform processing such as reducing a document feeding velocity at the above-described timing or switching a correction ratio of a read image.

As the document size Ly in the feeding direction becomes larger, it becomes more difficult to return the documents being fed overlapped to upstream by the separation roller 15, and in some cases, a jam may be caused. Therefore, for example, when the document size Ly in the feeding direction is larger than the predetermined size, the driving of the separation roller 15 is immediately stopped at the above-described timing so that the occurrence of the jam described above may be suppressed.

What is claimed is:

1. A medium feeding apparatus comprising:
a medium mounted section where a medium is mounted;
a feed roller feeding the medium mounted on the medium mounted section in a feeding direction;
a movement detection unit located upstream of the feed roller in the feeding direction to output information about a movement of the medium in the feeding direction; and
a control unit controlling, based on information obtained from the movement detection unit, feeding of the medium, wherein
when a movement of a subsequent medium in the feeding direction is detected based on detection information of the movement detection unit within a fault detection period that is set after a trailing edge of a preceding medium is detected based on the detection information of the movement detection unit and before feeding of the subsequent medium is started, the control unit is configured to execute a fault detection process to determine that there is a feeding fault, and
the fault detection period set when a size of the medium in the feeding direction is a first size is shorter than the fault detection period set when the size of the medium in the feeding direction is a second size larger than the first size.

2. The medium feeding apparatus according to claim 1, wherein
the control unit acquires, based on the detection information of the movement detection unit, the size of the medium in the feeding direction.

3. A medium feeding apparatus comprising:
a medium mounted section where a medium is mounted;
a feed roller feeding the medium mounted on the medium mounted section in a feeding direction;
a movement detection unit located upstream of the feed roller in the feeding direction to output information about a movement of the medium in the feeding direction; and a control unit controlling, based on information obtained from the movement detection unit, feeding of the medium, wherein when a movement of a subsequent medium in the feeding direction is detected based on detection information of the movement detection unit within a fault detection period that is set after a trailing edge of a preceding medium is detected based on the detection information of the movement detection unit and before feeding of the subsequent medium is started, the control unit is configured to execute a fault detection process to determine that there is a feeding fault, and the fault detection period set when a size of the medium in a width direction intersecting the feeding direction is a first size is shorter than the fault detection period set when the size of the medium in the width direction is a second size larger than the first size.

4. The medium feeding apparatus according to claim 3, further comprising a width size detection unit that is located downstream of the feed roller and that is configured to detect the size of the medium in the width direction, wherein the control unit acquires, based on detection information of the width size detection unit, the size of the medium in the width direction.

5. The medium feeding apparatus according to claim 1, further comprising a storage unit storing information, wherein the storage unit stores the fault detection period for each size of the medium.

6. The medium feeding apparatus according to claim 1, wherein the movement detection unit is configured to output information about a movement of the medium in a width direction intersecting the feeding direction, and when a value indicating the movement of the medium in the width direction, acquired by the movement detection unit, exceeds a threshold, the control unit determines that there is a feeding fault.

7. An image reading apparatus comprising:

a reading unit reading a medium; and the medium feeding apparatus according to claim 1, feeding the medium toward the reading unit.

8. A medium feeding method implemented by a medium feeding apparatus including a medium mounted section where a medium is mounted, a feed roller feeding the medium mounted on the medium mounted section in a feeding direction, and a movement detection unit located upstream of the feed roller in the feeding direction to output information about a movement of the medium in the feeding direction, the medium feeding method comprising, during a fault detection process to determine that there is a feeding fault when a movement of a subsequent medium in the feeding direction is detected based on detection information of the movement detection unit within a fault detection period that is set after a trailing edge of a preceding medium is detected based on the detection information of the movement detection unit and before feeding of the subsequent medium is started, setting the fault detection period set when a size of the medium in the feeding direction is a first size to be shorter than the fault detection period set when the size of the medium in the feeding direction is a second size larger than the first size.

* * * * *